(12) United States Patent
Matsuo

(10) Patent No.: US 12,348,168 B2
(45) Date of Patent: Jul. 1, 2025

(54) CONTROL DEVICE FOR ELECTRIC MOTOR

(71) Applicant: HITACHI ASTEMO, LTD., Hitachinaka (JP)

(72) Inventor: Kentaro Matsuo, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 96 days.

(21) Appl. No.: 18/261,863

(22) PCT Filed: Aug. 31, 2021

(86) PCT No.: PCT/JP2021/032028
§ 371 (c)(1),
(2) Date: Jul. 18, 2023

(87) PCT Pub. No.: WO2022/162989
PCT Pub. Date: Aug. 4, 2022

(65) Prior Publication Data
US 2024/0305233 A1    Sep. 12, 2024

(30) Foreign Application Priority Data
Jan. 29, 2021   (JP) .................. 2021-012640

(51) Int. Cl.
*H02P 27/08*  (2006.01)
*H02P 21/05*  (2006.01)

(52) U.S. Cl.
CPC .............. *H02P 27/08* (2013.01); *H02P 21/05* (2013.01); *H02P 2207/05* (2013.01)

(58) Field of Classification Search
CPC ...... H02P 21/18; H02P 21/05; H02P 2207/05; H02P 27/08; H02P 29/50; H02P 29/662;
(Continued)

(56) References Cited

U.S. PATENT DOCUMENTS

| 2009/0224720 A1 | 9/2009 | Oyobe et al. |
| 2016/0028340 A1 | 1/2016 | Nakai et al. |
| 2018/0241334 A1 | 8/2018 | Kobayashi |

FOREIGN PATENT DOCUMENTS

| EP | 1553693 B1 * | 12/2007 | .............. B60L 11/14 |
| JP | 2004-032944 A | 1/2004 | |

(Continued)

OTHER PUBLICATIONS

"Morioka, Tatsuru, AC Rotary Electric Machine Magnetic Noise Reduction Method, Motor Control Device and AC Rotary Electric Machine Using the Same, Dec. 19, 2007, Clarivate Analytics, pp. 1-112." (Year: 2007).*

(Continued)

*Primary Examiner* — Antony M Paul
(74) *Attorney, Agent, or Firm* — Foley & Lardner LLP

(57) ABSTRACT

A control device for an electric motor includes a harmonic voltage calculation unit that calculates a harmonic voltage to be added to a fundamental wave voltage command value, on a two-phase rotating coordinate system synchronized with a rotor phase, and a harmonic phase delay compensation unit that compensates for a phase delay during calculation in the harmonic voltage calculation unit based on a harmonic order of the harmonic voltage and an electrical angular frequency of the fundamental wave voltage.

2 Claims, 7 Drawing Sheets

(58) Field of Classification Search
CPC .......... H02P 27/02; H02P 27/04; H02P 27/06;
H02P 25/098; H02P 25/022; H02P
25/026; H02P 25/062; H02P 6/183; H02P
6/10; H02P 6/32; H02P 21/00; H02P
21/0003; H02P 21/22; H02P 21/14; H02P
23/07; H02P 23/14; H02P 1/42; H02P
1/46; H02P 29/045
See application file for complete search history.

(56) References Cited

FOREIGN PATENT DOCUMENTS

| | | |
|---|---|---|
| JP | 2007-6645 A | 1/2007 |
| JP | 2016-32407 A | 3/2016 |
| JP | 2016-82662 A | 5/2016 |
| WO | WO-2017/064946 A1 | 4/2017 |

OTHER PUBLICATIONS

International Search Report with English Translation and Written Opinion dated Oct. 26, 2021 in corresponding International Patent Application No. PCT/JP2021/032028 (9 pages).

\* cited by examiner

FIG. 5
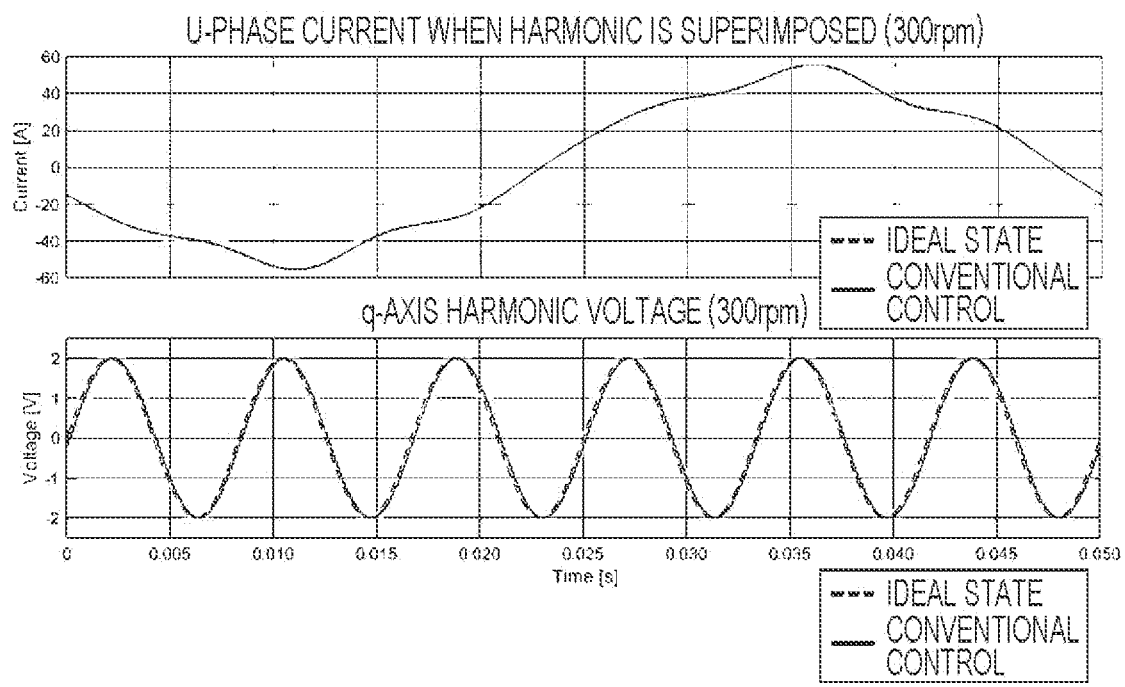
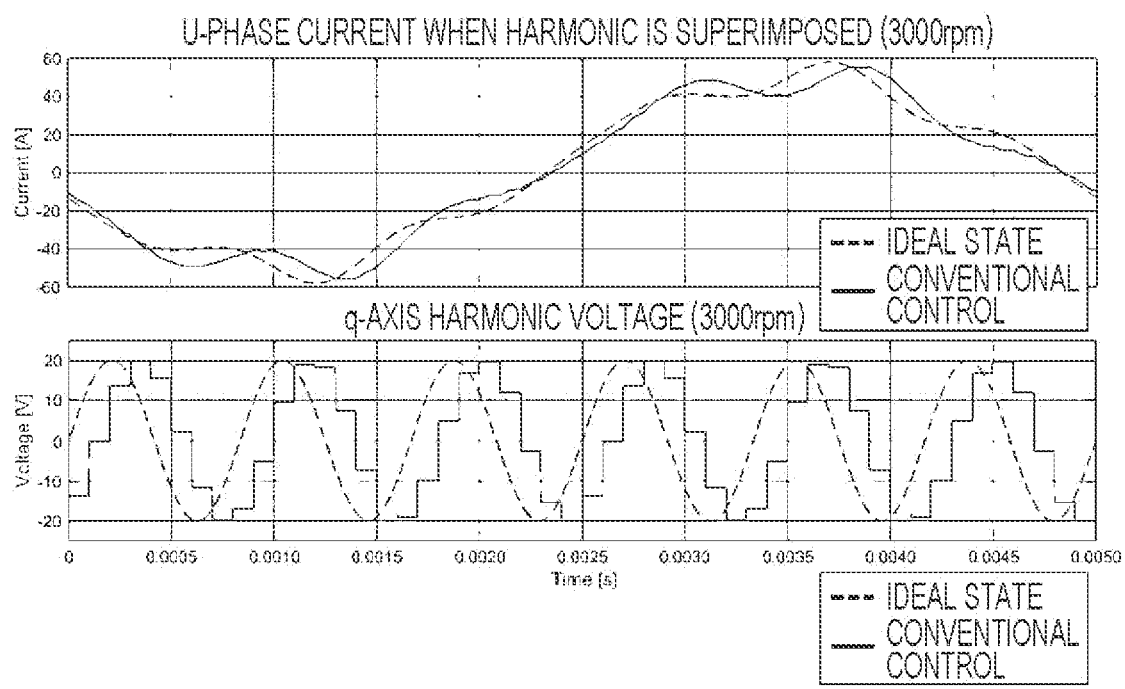

FIG. 7
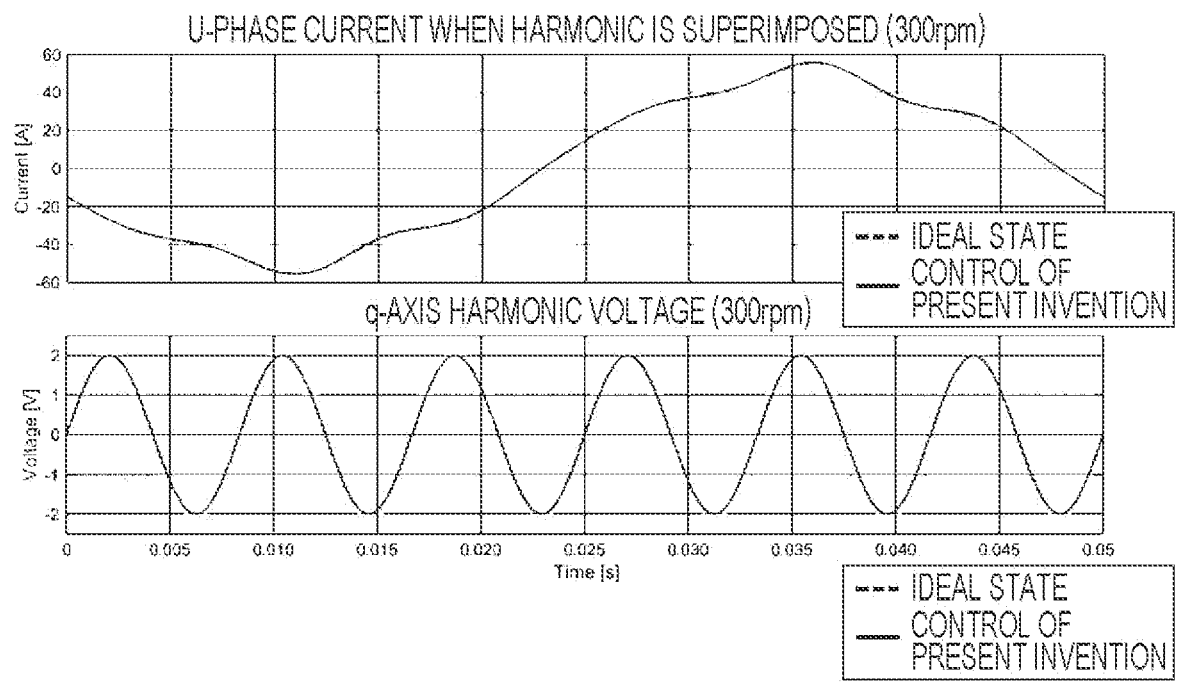
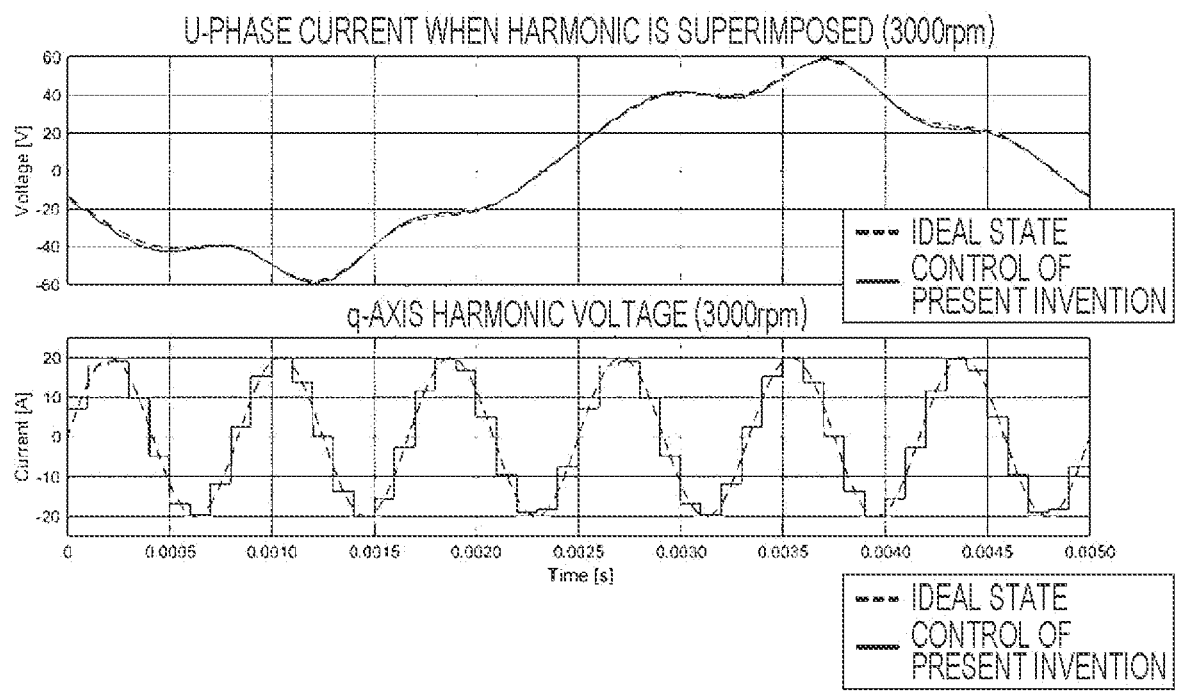

CONTROL DEVICE FOR ELECTRIC MOTOR

TECHNICAL FIELD

The present invention relates to a control device of an electric motor.

BACKGROUND ART

A permanent magnet synchronous motor is designed such that a magnetic flux generated by a stator and a magnetic flux generated by a rotor are sinusoidal. However, in many electric motors, harmonics synchronized with the rotor position (the phase of the rotor as viewed from the stator) are superimposed on the interlinkage magnetic flux by the structure of the teeth of the stator, the method of arranging the magnets of the rotor, and the like. As a result, the interlinkage magnetic flux is distorted, which causes noise and torque pulsation of the electric motor. When the electric motor is mounted on an electric vehicle, drivability and merchantability of the vehicle deteriorate.

The distortion of the interlinkage magnetic flux appears as a distortion of the induced voltage. The harmonic voltage included in the induced voltage is generated in synchronization with the phase of the rotor. Therefore, the distortion can be suppressed by superimposing the harmonic voltage of the opposite phase on the basis of the phase of the rotor by the inverter (controller), and noise and torque pulsation generated from the electric motor can be suppressed. Such a conventional technique is described in, for example, PTL 1.

CITATION LIST

Patent Literature

PTL 1: JP 2004-032944 A

SUMMARY OF INVENTION

Technical Problem

When a voltage command value is generated based on the phase of the rotor, it is necessary to consider a delay time from detection of the phase of the rotor to reflection on the voltage of the inverter. This is because the phase of the rotor advances during the delay time. In a current vector control, when the voltage command value on the rotating coordinate generated by the current controller is coordinate-converted into the voltage command value on the fixed coordinate, the detected phase delay of the rotor is compensated. Hereinafter, this is expressed as PWM phase delay compensation. The PWM phase delay compensation is compensation for the fundamental wave voltage, and does not function for the harmonic voltage superimposed by the controller.

The invention described in PTL 1 is a technique of calculating a harmonic voltage of an opposite phase based on a phase of a rotor and superimposing the harmonic voltage on a voltage command value on fixed coordinates of two phases. However, there is no PWM phase delay compensation for harmonic voltages superimposed by the controller. Therefore, when the speed of the electric motor is high, it is difficult to correctly superimpose the harmonic voltage.

A problem to be solved by the present invention is to superimpose a harmonic voltage of an opposite phase superimposed by a controller without a phase delay in order to suppress noise and torque pulsation generated from an electric motor.

Solution to Problem

Therefore, a control device for an electric motor according to the present invention includes a harmonic voltage calculation unit that calculates a harmonic voltage to be added to a fundamental wave voltage command value, on a two-phase rotating coordinate system synchronized with a rotor phase, and a harmonic phase delay compensation unit that compensates for a phase delay during calculation in the harmonic voltage calculation unit based on a harmonic order of the harmonic voltage and an electrical angular frequency of the fundamental wave voltage.

Advantageous Effects of Invention

It is possible to superimpose harmonic voltages of inversed phases superimposed by the controller without phase delay in order to suppress noise and torque pulsation generated from the electric motor.

BRIEF DESCRIPTION OF DRAWINGS

FIG. 5 is a simulation waveform in conventional processing of the controller 104.

FIG. 7 is a simulation waveform in processing of the controller 104 according to the present invention.

DESCRIPTION OF EMBODIMENTS

Figure 1:
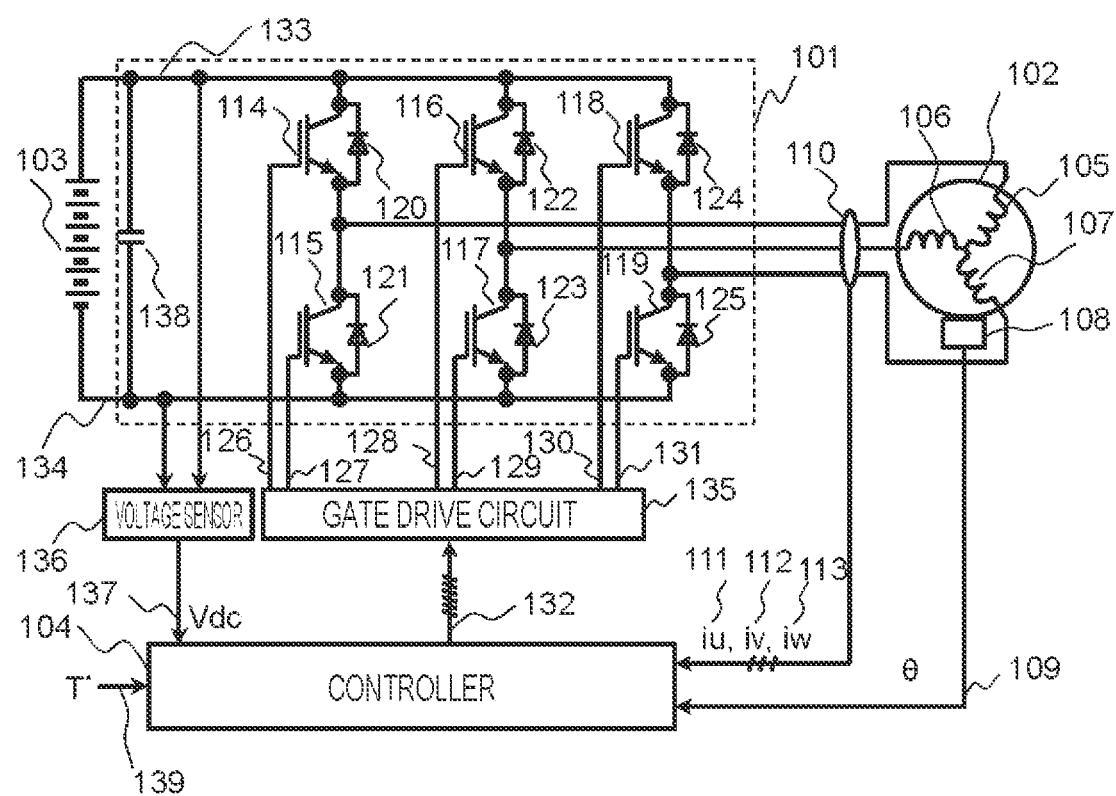
FIG. 1 is a diagram illustrating a schematic circuit configuration of a power conversion device.

Hereinafter, embodiments of a power conversion device according to the invention will be described with reference to the drawings. Further, the same element in the drawings will be attached with the same symbol, and the redundant description will be omitted.

FIG. 1 is a diagram illustrating a schematic circuit configuration of a power conversion device. In FIG. 1, the power conversion device for an electric motor 102 mainly includes an inverter 101, a battery 103, a controller 104, and the like. The inverter 101 is a three-phase voltage type two-level inverter.

The electric motor 102 is connected to a drive mechanism of an electric vehicle system, and the electric motor 102 rotates to propel the vehicle. The electric motor 102 of the present embodiment is an alternating-current electric motor, and is a three-phase interior permanent magnet synchronous motor (IPMSM). The electric motor 102 operates by an interaction between a magnetic flux generated from a permanent magnet provided in a rotor (not illustrated) and a magnetic field generated by currents iu, iv, and iw flowing through the three-phase windings 105, 106, and 107 fixed to an armature. iu, iv, and iw are a U-phase current, a V-phase current, and a W-phase current, respectively. In the present embodiment, a permanent magnet synchronous motor will be described, but the present invention is also applicable to other synchronous motors such as a wound field synchronous motor.

The electric motor 102 includes a magnetic pole position sensor 108. The magnetic pole position sensor 108 has a function of detecting a magnetic pole position of a rotor of the electric motor 102 as a phase with respect to a stator. The magnetic pole position sensor 108 outputs a rotor phase 109 (θ), and the rotor phase 109 is input to the controller 104. Processing in the controller 104 for the rotor phase 109 (θ) will be described later with reference to FIG. 2. The magnetic pole position sensor 108 can be configured by a resolver, a rotary encoder, an absolute encoder, or the like.

A current sensor 110 detects currents flowing through windings 105, 106, and 107, outputs a U-phase current sensor signal 111 (signal indicating the current iu), a V-phase current sensor signal 112 (signal indicating the current iv), and a W-phase current sensor signal 113 (signal indicating the current iw) based on the detected currents, and inputs the signals to the controller 104. Processing of the current sensor signals 111, 112, and 113 in the controller 104 will also be described later with reference to FIG. 2.

The inverter 101 includes switching elements 114, 115, 116, 117, 118, and 119 and freewheeling diodes 120, 121, 122, 123, 124, and 125. The switching elements 114 to 119 of the present embodiment are Si-IGBTs and include a gate terminal, a collector terminal, and an emitter terminal. The freewheeling diodes 120 to 125 are connected between a collector terminal and an emitter terminal of each of the switching elements 114 to 119. When the collector terminals of the switching elements 114 to 119 have a higher potential than the emitter terminal, the freewheeling diodes 120 to 125 allow a current to flow through the freewheeling diodes 120 to 125 to prevent a high reverse voltage from being applied to the switching elements 114 to 119. However, the present invention is not limited to the combination of the Si-IGBTs and the freewheeling diodes, and the inverter circuit may be configured by other semiconductor elements.

Switching on and off of the switching elements 114 to 119 is performed by gate drive signals 126, 127, 128, 129, 130, and 131 connected to gate terminals of the respective switching elements 114 to 119. The gate signal 132 that is a source of the gate drive signals 126 to 131 is generated by the controller 104 and output to a gate drive circuit 135. The gate drive circuit 135 converts the gate signal 132 into a potential necessary for switching on and off the switching elements 114, 115, 116, 117, 118, and 119, and outputs the gate drive signals 126, 127, 128, 129, 130, and 131. Generation of the gate signal 132 in the controller 104 will be described later with reference to FIG. 2.

The emitter terminal of the switching element 114 and the collector terminal of the switching element 115 are connected to each other, and the connection point thereof is connected to the winding 105 to flow the current iu. The emitter terminal of the switching element 116 and the collector terminal of the switching element 117 are connected to each other, and the connection point thereof is connected to the winding 106 to flow the current iv. The emitter terminal of the switching element 118 and the collector terminal of the switching element 119 are connected to each other, and the connection point thereof is connected to the winding 107 to flow the current iw. The collector terminals of the switching elements 114, 116, and 118 are connected to each other and connected to a high potential DC wiring 133. The emitter terminals of the switching elements 115, 117, and 119 are connected to each other and connected to a low potential DC wiring 134.

As a result, the controller 104 turns on and off the switching elements 114, 115, 116, 117, 118, and 119 at appropriate timings based on the generated gate signal 132, and controls the currents iu, iv, and iw flowing through the windings 105, 106, and 107 to realize rotation control of the electric motor 102. The gate signal 132 is in the form of a pulse width modulation (PWM) signal such that the currents iu, iv, and iw are sinusoidal signals having phases different from each other by 120 degrees.

A voltage sensor 136 is connected to the high potential DC wiring 133 and the low potential DC wiring 134, and detects a potential difference therebetween. Since the potential difference between the high potential DC wiring 133 and the low potential DC wiring 134 is usually a high voltage of, for example, 100 V or more, the voltage sensor 136 generates a DC voltage sensor signal 137 (Vdc) converted into a low voltage detectable by the controller 104 and inputs the DC voltage sensor signal to the controller 104.

A smoothing capacitor 138 included in the inverter 101 is connected between the high potential DC wiring 133 and the low potential DC wiring 134. The smoothing capacitor 138 has a function of suppressing pulsation of the DC voltage generated by the switching operations of the switching elements 114 to 119.

In the battery 103, a terminal on the high potential side of the battery 103 is connected to the high potential DC wiring 133, and a terminal on the low potential side of the battery 103 is connected to the low potential DC wiring 134. This functions as a DC power supply that supplies power to the inverter 101 and the electric motor 102.

A torque command 139 (T*) given from a host controller of a vehicle such as an electronic control unit (ECU) is input to the controller 104. The controller 104 performs torque control of the electric motor 102 based on the torque command 139 (T*). Although not illustrated in FIG. 1, a rotor temperature of the electric motor 102 is input to the controller 104. The rotor temperature is desirably detected by a temperature sensor, but a temperature estimated by a known method may be used.

Figure 2:
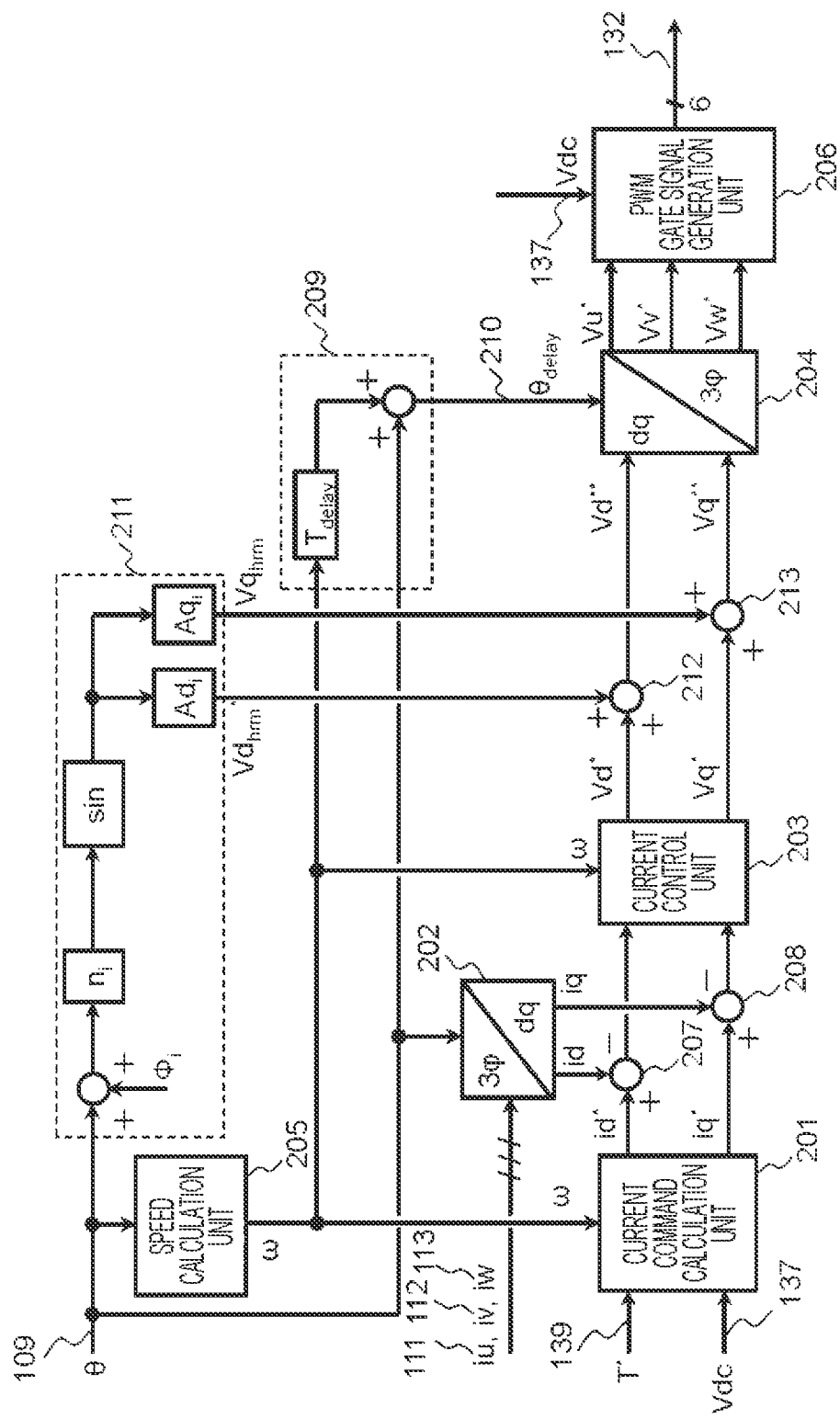
FIG. 2 is a processing block diagram for explaining conventional processing of a controller 104.

FIG. 2 is a processing block diagram for explaining conventional processing of the controller 104. In FIG. 2, the processing blocks of the controller 104 include a current command calculation unit 201, a three-phase/two-phase conversion unit 202, a current control unit 203, a two-phase/three-phase conversion unit 204, a speed calculation unit 205, a PWM gate control signal generation unit (control signal generation unit) 206, a deviation calculator 207, a deviation calculator 208, a PWM phase delay compensator 209, and a harmonic wave superposition unit 211. The current command calculation unit 201, the three-phase/two-phase conversion unit 202, the current control unit 203, the two-phase/three-phase conversion 204, unit the deviation calculator 207, and the deviation calculator 208 form a three-phase electrical pressure command value generation unit.

The controller 104 performs rotation control by causing the three-phase currents iu, iv, and iw to flow through the electric motor 102. In the controller 104, a so-called current vector control method is used in which processing is performed in a coordinate system obtained by converting a three-phase fixed coordinate into a two-phase rotating coordinate synchronized with a rotor phase represented by a d axis and a q axis.

The current command calculation unit 201 calculates a d-axis current command value id* and a q-axis current command value iq*. A torque command 139 (T*), a rotational angular velocity ω, and a DC voltage sensor signal 137 (Vdc) are input to the current command calculation unit 201, and the d-axis current command value id* and the q-axis current command value iq* are calculated. The rotational angular velocity ω is calculated by the speed calculation unit 205 based on the rotor phase 109 (θ).

The three-phase/two-phase conversion unit 202 performs coordinate conversion on the current sensor signals 111 (iu), 112 (iv), and 113 (iw) into the d-axis and the q-axis based on the information of the rotor phase 109 (θ), and outputs the d-axis detection current id and the q-axis detection current iq.

The deviation calculator 207 calculates a deviation between the d-axis current command value id* output from the current command calculation unit 201 and the d-axis detection current id output from the three-phase/two-phase conversion unit 202, and outputs a d-axis current deviation Δid to the current control unit 203. The deviation calculator 208 calculates a deviation between the q-axis current command value iq* output from the current command calculation unit 201 and the q-axis detection current iq output from the three-phase/two-phase conversion unit 202, and outputs a q-axis current deviation Δiq to the current control unit 203.

The current control unit 203 performs feedback control so that the d-axis current deviation Δid and the q-axis current deviation Δiq indicating a deviation between a command value that is a target value and a measured value that is an output value become 0, and calculates and outputs a d-axis voltage command Vd* and a q-axis voltage command Vq* that are voltage commands in order to update the output value. The feedback control in the current control unit 203 is performed by, for example, PI control.

An adder 212 adds Vd* and Vdhrm* output from the harmonic wave superposition unit 211 to be described later, and outputs a new d-axis voltage command value Vd. An adder 213** adds Vq* and Vqhrm* output from the harmonic wave superposition unit 211 to be described later, and outputs a new q-axis voltage command value Vq**.

Vd and Vq are input to the two-phase/three-phase conversion unit 204, and calculate and output three-phase voltage command values Vu*, Vv*, and Vw* based on a corrected rotor phase 210 (θdelay).

The corrected rotor phase 210 (θdelay) input to the two-phase/three-phase conversion unit 204 is calculated by the PWM phase delay compensator 209 as shown in Expressions (1) and (2).

$$\theta\text{delay} = \theta + \omega \times T delay \quad (1)$$

$$T delay = Ts[n] + 0.5 Ts[n+1] \quad (2)$$

In Expressions (1) and (2), Tdelay is the control delay time, Ts[n] is the present control period (carrier period), and Ts[n+1] is the control period at the time of the next interruption.

Here, PWM phase delay compensation, which is a technique according to the present invention, will be described. The PWM phase delay compensation is a function of estimating a rotor phase advanced during a control delay time and performing coordinate conversion when a voltage command value on a rotating coordinate synchronized with a rotor phase is converted into a value on UVW fixed coordinates. The reason why the control delay time is generated and the compensation method will be described below.

Figure 3:
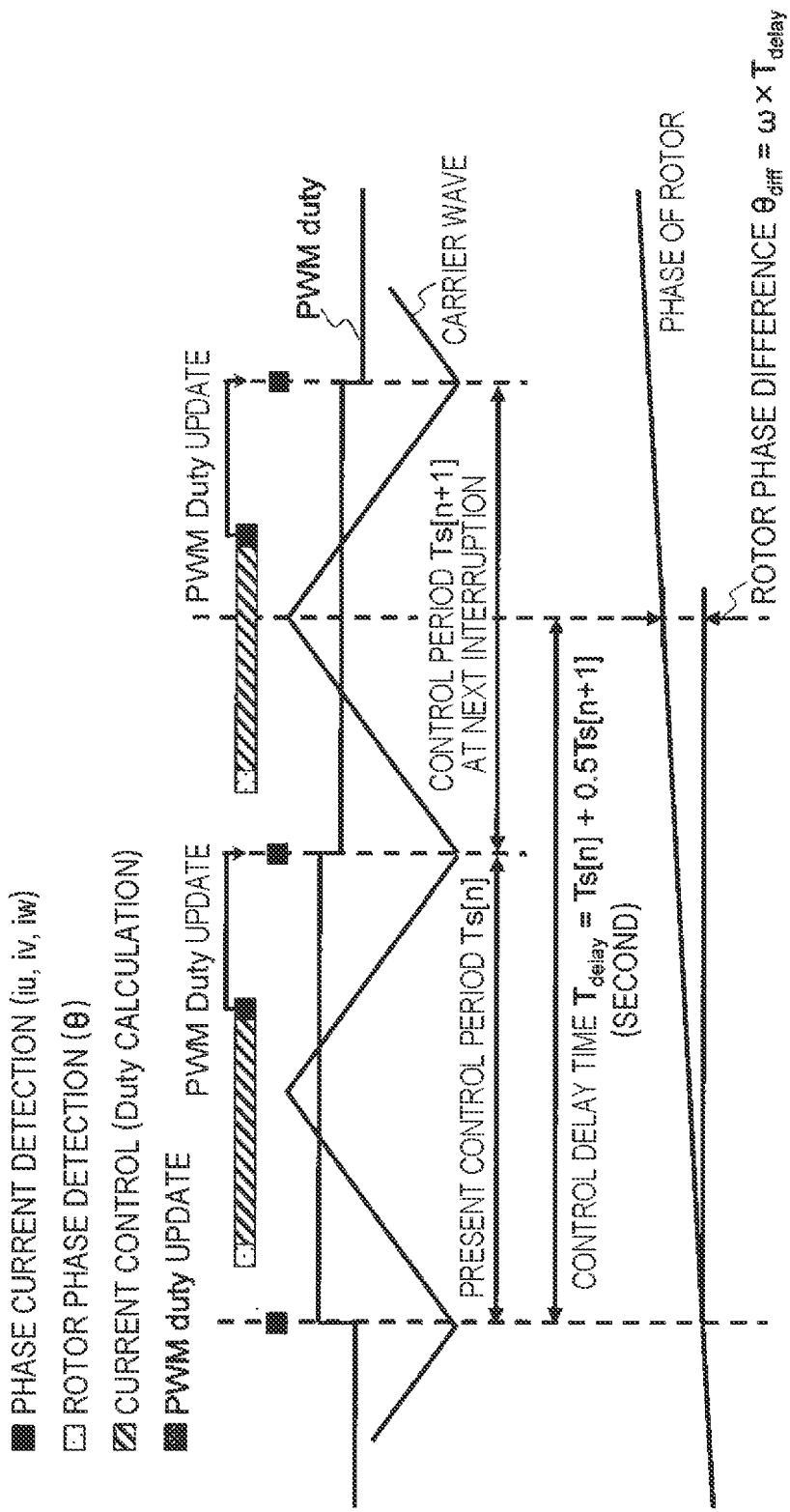
FIG. 3 is a diagram illustrating a principle of PWM phase delay compensation.

FIG. 3 illustrates an example of the relationship between the operation timing (phase current detection and rotor phase, current control, and PWM duty update) of the controller 4 and the rotor phase and the control delay time when the horizontal axis is time. However, the detection timing of the DC voltage sensor signal 137 (Vdc) used for the PWM duty calculation is omitted. As illustrated in FIG. 3, the update timing of the PWM duty is delayed by the present control period Ts[n] with respect to the detection of the phase current and the rotor phase. In addition, the PWM duty is constant during the period of the control period Ts[n+1] at the time of the next interruption, and it is necessary to set the average PWM duty during this period. Therefore, the control delay time Tdelay from the detection of the phase current and the rotor phase to the update of the PWM duty is expressed by Expression (2) described above.

If the change in the rotational angular velocity ω is slow and does not change during the control delay time Tdelay, the rotor phase difference θdiff proceeding during Tdelay can be calculated as in Expression (3).

$$\theta diff = \omega \times T delay \quad (3)$$

By adding θdiff to the detected rotor phase θ, the rotor phase θdelay at the time of updating the PWM duty can be estimated as in Expression (1). The above is the principle of PWM phase delay compensation.

The PWM gate control signal generation unit (control signal generation unit) 206 calculates a PWM duty by using the three-phase voltage command values Vu*, Vv*, and Vw* and Vdc. Then, by comparing the PWM duty with a carrier wave (not illustrated), six gate signals 132 which are PWM signals are generated and output to the gate drive circuit 135.

Figure 4:
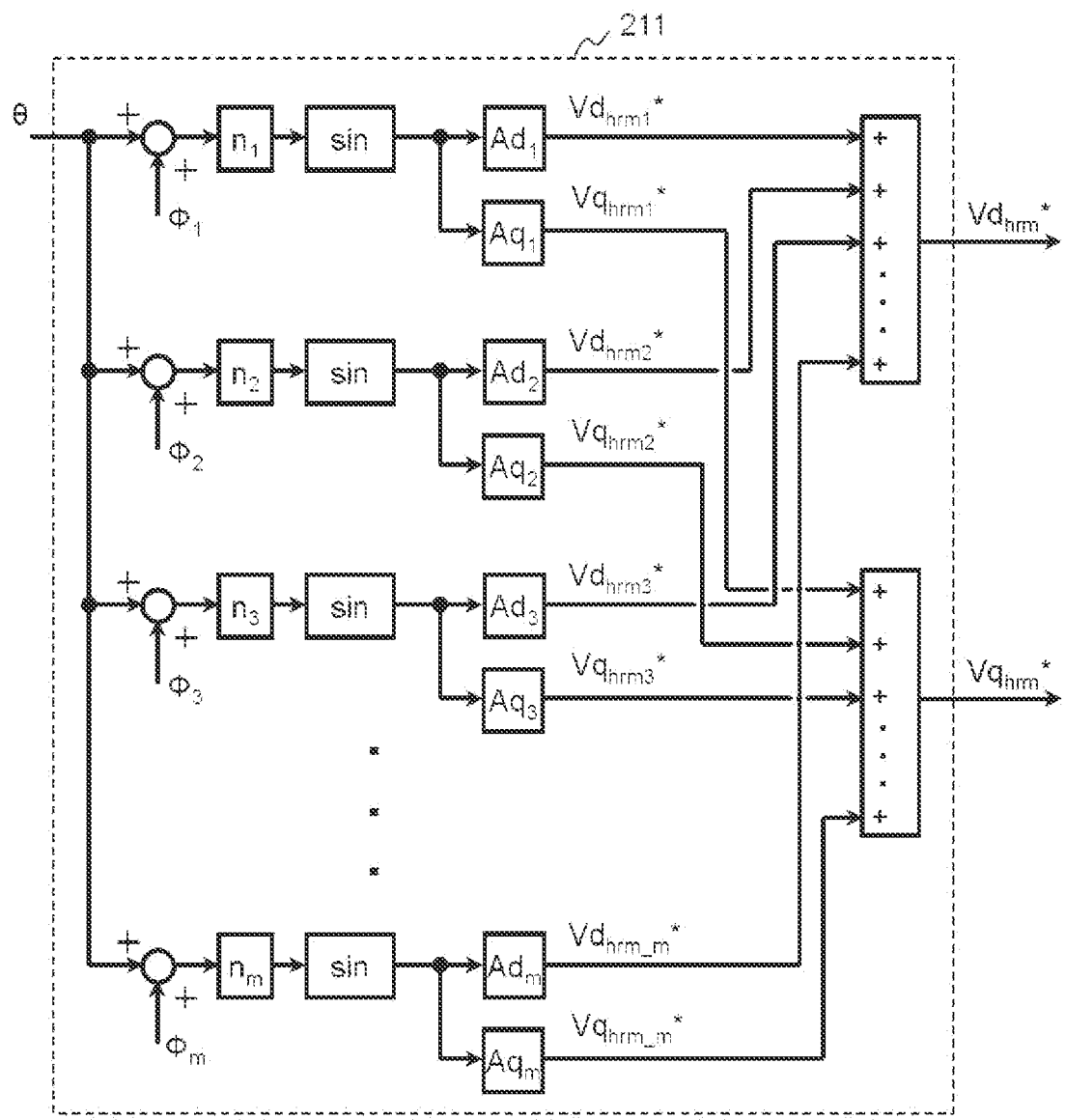
FIG. 4 is a processing block diagram of a harmonic wave superposition unit 211.

FIG. 4 is a processing block diagram of the harmonic wave superposition unit 211. The d-axis harmonic voltage command value Vdhrm* and the q-axis harmonic voltage command value Vqhrm* are output by calculation of Expressions (4) and (5).

$$Vdhrm^* = \sum(Adi \times \text{SIN}(ni(\theta + \Phi i))) \quad (4)$$

$$Vqhrm^* = \sum(Aqi \times \text{SIN}(ni(\theta + \Phi i))) \quad (5)$$

In Expressions (4) and (5), Adi is a d-axis harmonic voltage amplitude, Aqi is a q-axis harmonic voltage amplitude, ni is a harmonic order, and Φi is a harmonic voltage phase. Further, i is an integer of 1 to m. Vdhrm* and Vqhrm* are signals obtained by combining harmonic voltages of a plurality of orders, and a harmonic voltage to be superimposed is selected according to the harmonic voltage included in the induced voltage of the electric motor. The harmonic voltage included in the induced voltage is mainly 6n±1st order (n is a natural number excluding 0, in the case of three-phase equilibrium) on fixed coordinates, and is 6n-th order on rotating coordinates synchronized with the rotor phase. Therefore, the harmonic to be superimposed may be 6n-th order.

Adi, Aqi, and Φi are set to cancel the harmonic voltage superimposed on the induced voltage. These values are not constant values, and may be changed in a lookup table or the like depending on torque, current, rotational speed, or the like.

The above is the conventional processing of the controller 4. Here, problems of the conventional processing will be described.

FIG. 5 illustrates waveforms (simulation waveforms) of the U-phase current iu and the q-axis harmonic voltage Vqhrm when the harmonic voltage is superimposed only on the q-axis in the conventional processing of the controller 104 illustrated in FIG. 2. The waveform in the ideal state is indicated by a dotted line, and the waveform in the conventional control is indicated by a dotted line. In addition, in order to compare the low rotation and the high rotation, two results of 300 rpm and 3000 rpm are compared. The ideal state indicates an analysis result in a continuous system. In the conventional control, in order to facilitate comparison, simulation has been performed by a model in consideration of delay due to discrete control without simulating PWM control of the inverter. The control period is 10 kHz.

In the case of 300 rpm at which the rotation speed is low, the q-axis harmonic voltage of the conventional control is delayed from the ideal state, but a large delay does not occur. Therefore, it can be seen that there is no large difference between the ideal state and the conventional control in the U-phase current. On the other hand, at 3000 rpm at which the rotation speed is high, the q-axis harmonic voltage of the conventional control is greatly delayed from the ideal state, and thus, it can be seen that a large difference also occurs in the U-phase current.

As described above, in a case where there is no PWM phase delay compensation for the harmonic voltage superimposed by the controller, the harmonic voltage to be superimposed cannot be correctly superimposed as the electric motor becomes faster. As a result, not only noise and torque pulsation caused by the electric motor cannot be suppressed, but also noise and torque pulsation may be amplified depending on the magnitude of the delay phase.

Figure 6:
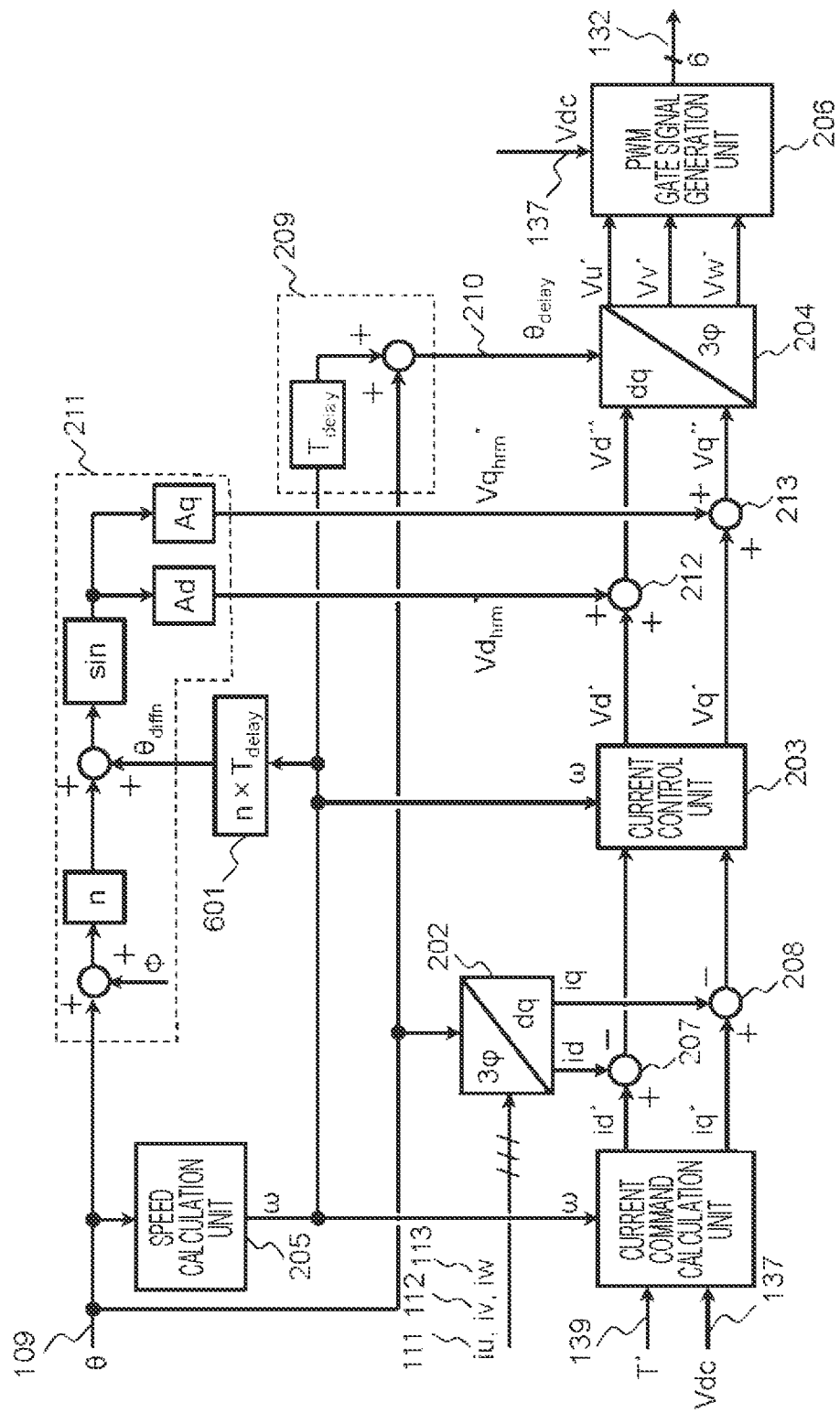
FIG. 6 is a processing block diagram for explaining processing of the controller 104 according to the present invention.

FIG. 6 is a processing block diagram illustrating processing of the controller 104 according to the present invention. FIG. 6 has a configuration in which a harmonic phase delay compensation unit 601 is added to FIG. 2.

As described with reference to FIG. 3, the detection of the rotor phase and the reflection of the detected rotor phase in the voltage command are delayed by Tdelay. Since the phase of the n-th harmonic advances n times with respect to the fundamental wave, a phase θdiffn at which the n-th harmonic advances during Tdelay is expressed by Expression (6).

$$\theta diffn = n \times \omega \times Tdelay \quad (6)$$

The harmonic phase delay compensation unit 601 advances the phase of the harmonic to be superimposed by θdiffn to compensate for the phase delay with respect to the harmonic. Expressions (4) and (5) are denoted as follows in consideration of phase delay compensation for harmonics.

$$Vdhrm^* = \sum(Adi \times SIN(ni(\theta + \omega \times Tdelay + \Phi i))) \quad (7)$$

$$Vqhrm^* = \sum(Aqi \times SIN(ni(\theta + \omega \times Tdelay + \Phi i))) \quad (8)$$

The above expressions can be modified as follows using Expression (1).

$$Vdhrm^* = \sum(Adi \times SIN(ni(\theta delay + \Phi i))) \quad (9)$$

$$Vqhrm^* = \sum(Aqi \times SIN(ni(\theta delay + \Phi i))) \quad (10)$$

From Expressions (9) and (10), in actual implementation, phase delay compensation for harmonics can be realized by replacing the input θ in FIG. 4 with the output θdelay of the PWM phase delay compensator 209.

Each of Vdhrm* and Vqhrm* calculated as described above is added to the dq-axis voltage command on the rotating coordinate, and is converted into a three-phase voltage command value by the two-phase/three-phase conversion unit 204.

In this configuration, phase delay compensation by the harmonic phase delay compensation unit 601 and phase delay compensation by the two-phase/three-phase conversion unit 204 and the PWM phase delay compensator 209 are doubly performed for the harmonic voltage command to be superimposed. This principle will be described below.

The harmonic voltages Vdhrm and Vqhrm to be superimposed are expressed by the following Expressions (11) and (12).

$$Vdhrm = Ad \times SIN(n(\theta + \Phi)) \quad (11)$$

$$Vqhrm = Aq \times SIN(n(\theta + \Phi)) \quad (12)$$

The phase voltages Vu, Vv, and Vw after harmonic wave superposition can be expressed as follows.

$$Vu = Ad \times SIN(n(\theta + \Phi)) \times COS\theta - Aq \times SIN(n(\theta + \Phi)) \times SIN\theta \quad (13)$$

$$Vv = Ad \times SIN(n(\theta + \Phi)) \times COS(\theta - 2\pi/3) - \quad (14)$$
$$Aq \times SIN(n(\theta + \Phi)) \times SIN(\theta - 2\pi/3)$$

$$Vw = Ad \times SIN(n(\theta + \Phi)) \times COS(\theta + 2\pi/3) - \quad (15)$$
$$Aq \times SIN(n(\theta + \Phi)) \times SIN(\theta - 2\pi/3)$$

In Expression (13), Ad×SIN(n(θ+Φ)) and Aq×SIN(n(θ+Φ)) represent superimposed harmonics, and a term after these represents a term of coordinate conversion. The same applies to Expressions (14) and (15). θ used for harmonic calculation and coordinate conversion needs to be calculated using θ when the voltage of the inverter is reflected. That is, phase delay compensation is required for each calculation.

Therefore, phase delay compensation by the harmonic phase delay compensation unit 601 and phase delay compensation by the two-phase/three-phase conversion unit 204 and the PWM phase delay compensator 209 are required.

FIG. 7 illustrates waveforms (simulation waveforms) of the U-phase current iu and the q-axis harmonic voltage Vqhrm when the harmonic voltage is superimposed only on the q-axis in the processing of the present invention by the controller 104 illustrated in FIG. 6. The simulation conditions are similar to those illustrated in FIG. 5.

In both cases of 300 rpm and 3000 rpm, the q-axis harmonic voltage of the control of the present invention is not delayed with respect to the ideal state. Therefore, it can be seen that there is a difference in the U-phase current due to the discretization error, but there is no large difference between the ideal state and the control of the present invention.

As described above, the control device for the electric motor according to the present invention includes the harmonic voltage calculation unit that calculates the harmonic voltage to be added to the fundamental wave voltage command value, on the two-phase rotating coordinate system synchronized with the rotor phase, and the harmonic phase delay compensation unit that compensates for the phase delay during calculation in the harmonic voltage calculation unit based on the harmonic order of the harmonic voltage and the electrical angular frequency of the fundamental wave voltage. This makes it possible to superimpose harmonic voltages of inversed phases superimposed by the controller without phase delay in order to suppress noise and torque pulsation generated from the electric motor.

Note that the present invention is not limited to the embodiments described above, but includes various modifications. For example, the above embodiments have been described in detail for easy understanding of the present invention, and the present invention is not necessarily limited to those having all the configurations described.

REFERENCE SIGNS LIST 101 inverter
102 electric motor
103 battery
104 controller
105 to 107 three-phase winding
108 magnetic pole position sensor
109 rotor phase
110 current sensor
111 U-phase current sensor signal
112 V-phase current sensor signal
113 W-phase current sensor signal
114 to 119 switching element
120 to 125 IGBT
126 to 131 gate drive signal
132 gate signal
133 high potential DC wiring
134 low potential DC wiring
135 gate drive circuit
136 voltage sensor
137 DC voltage sensor signal
138 smoothing capacitor
139 torque command
201 current command calculation unit
202 three-phase/two-phase conversion unit
203 current control unit
204 two-phase/three-phase conversion unit
205 speed calculation unit
206 PWM gate control signal generation unit (control signal generation unit)
207 deviation calculator
208 deviation calculator
209 PWM phase delay compensator
211 harmonic wave superposition unit
601 harmonic phase delay compensation unit

The invention claimed is:

1. A control device for an electric motor comprising:
   a harmonic voltage calculation unit that calculates a harmonic voltage to be added to a fundamental wave voltage command value, on a two-phase rotating coordinate system synchronized with a rotor phase; and
   a harmonic phase delay compensation unit that compensates during calculation in the harmonic voltage calculation unit based on a harmonic order of the harmonic voltage and an electrical angular frequency of a fundamental wave voltage.

2. The control device for an electric motor according to claim 1, wherein a harmonic voltage calculated by the harmonic voltage calculation unit is added to the fundamental wave voltage command value, on a two-phase rotating coordinate system synchronized with a rotor phase.

* * * * *